United States Patent
Mirassou et al.

(10) Patent No.: US 11,112,277 B2
(45) Date of Patent: Sep. 7, 2021

(54) CAMSHAFT OR CRANKSHAFT SENSOR FOR AUTOMOTIVE VEHICLE AND DIAGNOSTIC METHOD FOR SUCH A SENSOR

(71) Applicants: CONTINENTAL AUTOMOTIVE FRANCE, Toulouse (FR); CONTINENTAL AUTOMOTIVE GMBH, Hannover (DE)

(72) Inventors: David Mirassou, Toulouse (FR); Marie-Nathalie Larue, Corronsac (FR); Yann Dinard, Frankfurt am Main (DE); Olivier Marle, Deyme (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 326 days.

(21) Appl. No.: 15/531,338

(22) PCT Filed: Nov. 26, 2015

(86) PCT No.: PCT/EP2015/002381
§ 371 (c)(1),
(2) Date: May 26, 2017

(87) PCT Pub. No.: WO2016/082933
PCT Pub. Date: Jun. 2, 2016

(65) Prior Publication Data
US 2017/0322053 A1 Nov. 9, 2017

(30) Foreign Application Priority Data
Nov. 28, 2014 (FR) ...................................... 1461639

(51) Int. Cl.
*G01D 5/244* (2006.01)
*G01D 18/00* (2006.01)
(Continued)

(52) U.S. Cl.
CPC ........... *G01D 5/24476* (2013.01); *G01D 1/12* (2013.01); *G01D 3/028* (2013.01);
(Continued)

(58) Field of Classification Search
CPC ...... G01D 1/12; G01D 3/028; G01D 5/24495; G01D 18/00; G01D 5/24476
See application file for complete search history.

(56) References Cited

U.S. PATENT DOCUMENTS

| 5,541,859 A | 7/1996 | Inoue et al. |
| 6,100,682 A | 8/2000 | Schroeder |

(Continued)

FOREIGN PATENT DOCUMENTS

| CN | 102032891 | 4/2011 |
| CN | 102435220 | 5/2012 |

(Continued)

OTHER PUBLICATIONS

International Search Report, dated Feb. 10, 2016, from corresponding PCT application.

*Primary Examiner* — Lee E Rodak
*Assistant Examiner* — Brent J Andrews
(74) *Attorney, Agent, or Firm* — Nixon & Vanderhye

(57) ABSTRACT

Disclosed is a camshaft or crankshaft sensor including a toothed target, a measuring cell adapted to supply a raw signal and a processor module having two modes of operation: 1) a measurement mode in which the processor module is adapted to supply an output port of the sensor a measurement signal representing the times of passage of the teeth of the target at the level of the measuring cell; and 2) a (Continued)

diagnostic mode in which the processor module is adapted to supply at the output port of the sensor a diagnostic signal different from the measurement signal and representing the amplitude of the raw signal. Also disclosed is a method and a module for diagnosing such a sensor.

20 Claims, 1 Drawing Sheet

(51) Int. Cl.
    *G01D 1/12*       (2006.01)
    *G01D 3/028*    (2006.01)
    *G01D 5/14*       (2006.01)

(52) U.S. Cl.
    CPC ......... *G01D 5/24495* (2013.01); *G01D 18/00* (2013.01); *G01D 5/145* (2013.01)

(56) References Cited

U.S. PATENT DOCUMENTS

| | | | |
|---|---|---|---|
| 6,522,131 B1 * | 2/2003 | Hiligsmann | G01D 3/02 |
| | | | 324/174 |
| 2009/0001965 A1 | 1/2009 | Ausserlechner et al. | |
| 2009/0216420 A1 * | 8/2009 | Jozefowicz | F02D 41/009 |
| | | | 701/102 |
| 2010/0277224 A1 * | 11/2010 | Jockel | G01P 21/02 |
| | | | 327/530 |
| 2012/0078564 A1 | 3/2012 | Goodwin | |
| 2014/0195186 A1 * | 7/2014 | Carbonne | G01R 33/091 |
| | | | 702/94 |
| 2014/0325960 A1 * | 11/2014 | Mahaveera | F02D 41/1454 |
| | | | 60/274 |
| 2015/0243461 A1 * | 8/2015 | Werth | F02D 41/3005 |
| | | | 307/116 |

FOREIGN PATENT DOCUMENTS

| | | |
|---|---|---|
| CN | 102638249 | 8/2012 |
| CN | 103842839 | 6/2014 |
| FR | 2 978 833 A1 | 2/2013 |
| WO | 2013/017211 A1 | 2/2013 |

* cited by examiner

CAMSHAFT OR CRANKSHAFT SENSOR FOR AUTOMOTIVE VEHICLE AND DIAGNOSTIC METHOD FOR SUCH A SENSOR

The present invention belongs to the field of motor vehicle sensors and more particularly concerns a camshaft or crankshaft sensor and a method and a module for diagnosing a camshaft or crankshaft sensor of this kind.

BACKGROUND OF THE INVENTION

A camshaft or crankshaft sensor is used in a motor vehicle to determine the angular position of the camshaft or the crankshaft of the engine of the motor vehicle.

A sensor of this kind includes a target mounted on the camshaft or on the crankshaft and a measuring cell (Hall-effect cell, magneto-resistive cell, giant magneto-resistive (GMR) cell, etc.) that supplies a raw signal representing the intensity of a magnetic field at the level of said measuring cell. The magnetic field measured by the measuring cell is formed by the target itself, for example, which where necessary consists of a magnetic material, or by a magnetic field generator separate from the target, such as a permanent magnet.

The target takes the form of a disc the periphery of which is toothed. In the case of a sensor including a magnetic field generator separate from the target, said target is "geometrically" toothed, i.e. the geometry of the periphery of said target features teeth and gaps. When the magnetic field generator is the target, said target is "magnetically" toothed, i.e. the periphery of said target features alternating north poles (regarded as hereinafter similar to the teeth) and south poles (regarded hereinafter as similar to the gaps).

The teeth of the target is generally the same height, but may have spacings (gaps) and lengths that are not all identical so as to code the angular position of the target.

The rotation of the target will therefore generate variations of the magnetic field measured by the measurement cell, which variations can be analysed to recognise the various teeth of the target and to decode the angular position of the target and, in the end, the angular position of the camshaft or of the crankshaft fastened to said target.

The sensor also includes a processor module connected to the output of the measurement cell. From the raw signal supplied by the measurement cell, the processor module supplies at an output port of the sensor a measurement signal representing the times of passage of the teeth of the target in front of the measurement cell. The measurement signal may typically assume two states, according to whether the raw signal is above or below a predefined threshold value, for example. The passage of a tooth of the target in front of the measurement cell therefore corresponds to a pulse of the measurement signal. A computer connected to the output port can therefore recognise the various teeth of the target from the pulses of the measurement signal and decode the angular positon of said target.

To this end, it is important to guarantee a good match between the times of the rising and falling edges of the measurement signal and the angular positions of the geometric or magnetic rising and falling edges of the target.

However, for cost reasons, the targets are mass-produced and often suffer from manufacturing defects which lead to an imperfect knowledge of the angular positions of the geometric or magnetic rising and falling edges of the target. In particular, the teeth do not always have the same height relative to the centre of the target ("out of round"). Other manufacturing defects are possible, and in particular a magnetic material target may bear scratches liable to modify locally the magnetic field generated by the target.

To these manufacturing defects of the target may be added defects introduced when mounting the target on the camshaft or on the crankshaft. For example, the camshaft or the crankshaft may not pass exactly through the centre of the target and/or the target may be damaged during assembly of the engine.

A result of this is that it is necessary to be able to diagnose the camshaft or crankshaft sensor, in particular the target of that sensor, in order to identify a defect of said sensor that may necessitate its replacement as soon as possible, typically before the vehicle enters traffic.

To this end, it is known to connect the output of the measurement cell also to a dedicated diagnostic port. By connecting a diagnostic device to the diagnostic port it is therefore possible to analyse directly the raw signal supplied by the measurement cell in order to detect defects of the target. However, this kind of capacity to diagnose the sensor is accompanied by a large increase in the cost of manufacturing said sensor.

SUMMARY OF THE INVENTION

An objective of the present invention is to remedy some or all of the limitations of the prior art solutions, notably those described above, by proposing a solution that makes it possible to diagnose a camshaft or crankshaft sensor whilst reducing the cost of manufacturing said sensor relative to known sensors.

To this end, and in accordance with a first aspect, the present invention concerns a motor vehicle camshaft or crankshaft sensor, said sensor including a toothed target, a measuring cell adapted to supply a raw signal representing variations of a magnetic field induced by the rotation of the target, and a module for processing the raw signal. In accordance with the invention, the processor module has two modes of operation:
- a first mode of operation, referred to as the "measurement mode", in which the processor module is adapted to supply at an output port of the sensor a measurement signal representing the times of passage of the teeth of the target at the level of the measuring cell,
- a second mode of operation, referred to as the "diagnostic mode", in which the processor module is adapted to supply at said output port of the sensor a diagnostic signal different from the measurement signal and representing the amplitude of the raw signal.

The processor module of the sensor can therefore be configured either in the measurement mode or in the diagnostic mode. The processor module moreover utilizes the same output port of the sensor to supply the measurement signal or the diagnostic signal at different time intervals. It is therefore not necessary to provide a dedicated diagnostic port, which makes it possible to reduce the manufacturing cost compared to known sensors. It is therefore possible either to determine the angular position of the target or to diagnose said sensor on the basis of the signal received at the output port of the sensor.

In particular embodiments, the camshaft or crankshaft sensor may also have one or more of the following features, separately or in all technically possible combinations.

In particular embodiments, the processor module is adapted to be configured via the output port and/or via an electrical power supply port of said sensor.

Using the output port and/or the electrical power supply port is advantageous in that these ports are always present on existing sensors and configuring the processor module does not necessitate a dedicated port.

In particular embodiments, the diagnostic signal corresponds to one or more local maxima values and/or local minima values of the raw signal.

In the diagnostic mode, the diagnostic signal represents the amplitude of the raw signal. However, the bit rate necessary for supplying the values of the amplitude at all the times of sampling the raw signal may necessitate modification of the output port to increase its bit rate. For example, an open-collector output stage may not offer a sufficient bit rate and must if necessary be replaced by a "push-pull" stage, which is more costly and bulkier in terms of the chip area. By assigning the processor module the task of identifying the local maxima and/or the local minima of the raw signal and limiting the diagnostic signal to only the values of said local maxima and/or local minima the necessary bit rate is significantly reduced. This bit rate is compatible with the use of a relatively low cost output port that is relatively compact, such as an open-collector output stage. Moreover, the values of the local maxima and/or the local minima may advantageously be extremely precise, i.e. coded with a large number of bits, since the number of these values transmitted to the output port is very small.

In particular embodiments, the diagnostic signal corresponds to the value of the last local maximum identified and/or the value of the last local minimum identified.

In accordance with a second aspect, the present invention concerns a method of diagnosing a camshaft or crankshaft sensor according to any one of the embodiments of the invention, said method including:
  a step of configuration of the processor module in the diagnostic mode,
  a recurrent step of recovery of the diagnostic signal at the output port, the diagnostic signal corresponding to the value of a local maximum and/or a local minimum of the raw signal,
  a step of diagnosing the sensor by comparison of the diagnostic signals recovered at the output port of the sensor.

In particular embodiments, the camshaft or crankshaft sensor diagnostic method may also have one or more of the following features, separately or in all technically possible combinations.

In particular embodiments, the recovery step is executed at particular times as a function of a predefined maximum value of the rotation speed of the target so as to recover in one rotation of the target values of the local maxima and/or local minima corresponding to each of the teeth of said target.

In particular embodiments, the recovery step is executed at particular times as a function of an estimate of the real rotation speed of the target so as to recover in one rotation of the target values of the local maxima and/or the local minima corresponding to each of the teeth of said target.

In particular embodiments, during the diagnostic step the sensor is considered faulty if the ratio between the maximum value and the minimum value of the local maxima of the raw signal is above a predefined threshold value.

In accordance with a third aspect, the present invention concerns a module for diagnosing a camshaft or crankshaft sensor, including means configured to diagnose said sensor in accordance with a method according to any one of the embodiments of the invention. The processor module is for example incorporated in a computer of the motor vehicle in which the sensor is mounted, such as the engine computer, or in a diagnostic tool external to said motor vehicle and intended to be connected to it.

BRIEF DESCRIPTION OF THE DRAWINGS

The invention will be better understood on reading the following description given by way of nonlimiting example and with reference to the figures, which show.

DETAILED DESCRIPTION OF THE PREFERRED EMBODIMENTS

In these figures, references that are identical from one figure to another designate identical or analogous elements. For clarity, the elements represented are not represented to scale unless otherwise indicated.

Figure 1:
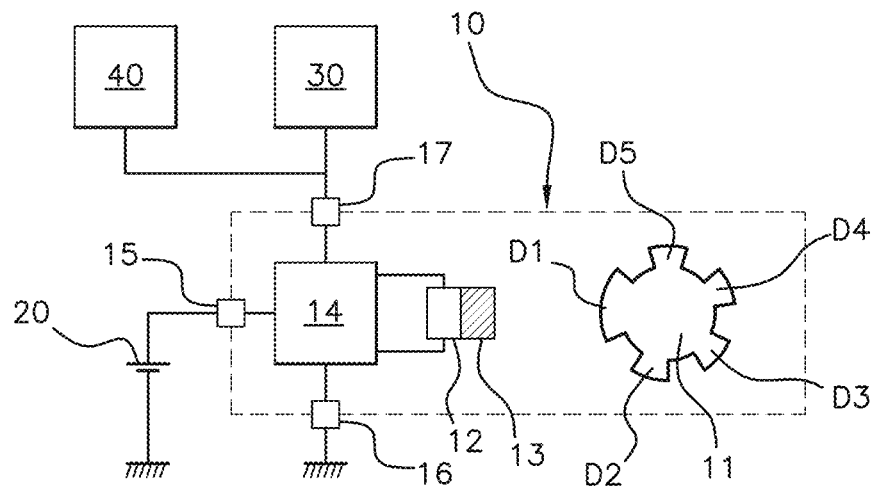
FIG. 1: a diagrammatic representation of one embodiment of a camshaft or crankshaft sensor.

FIG. 1 represents diagrammatically one embodiment of a camshaft or crankshaft sensor 10 of a motor vehicle (not represented in the figures).

As illustrated by FIG. 1, the sensor 10 includes a toothed target 11 fastened to the camshaft or the crankshaft (not represented in the figures). The sensor 10 also includes a measuring cell 12 (Hall-effect cell, magneto-resistive cell, giant magneto-resistive (GMR) cell, etc.) that supplies a raw signal representing the intensity of a magnetic field at the level of said measuring cell.

In the example illustrated by FIG. 1, the nonlimiting situation is that in which the sensor 10 includes a magnetic field generator 13 separate from the target 11, such as a permanent magnet. The target 11 is therefore "geometrically" toothed, and takes the form of a disc the periphery of which includes a plurality of teeth D1, D2, D3, D4, D5 considered in a nonlimiting manner to be all of the same height when said target 11 has a perfect geometry. In the example illustrated by FIG. 1, the target 11 includes five teeth D1, D2, D3, D4, D5 with lengths that are not all identical. To be more specific, the teeth D2, D3, D4 and D5 are the same length while the tooth D1 has a different length, greater than that of the teeth D2, D3, D4, D5. In the example represented, the spacing between teeth, i.e. the length of the gaps, is the same for all the teeth D1, D2, D3, D4, D5.

In accordance with other examples, there is nothing to rule out having a magnetic field generated by the target 11 which, if necessary, is "magnetically" toothed, i.e. the periphery of said target features alternating north poles (regarded as similar to the teeth) and south poles (regarded as similar to the gaps).

In conventional manner, the magnetic field generated by the generator 13 is modified by the rotation of the target 11 fastened to the camshaft or to the crankshaft. The measuring cell 12 supplies an analogue signal, referred to as "raw signal", that represents the variations of the magnetic field induced by the rotation of the target 11.

The sensor 10 further includes a module 14 for processing the raw signal and three ports:
  an electrical power supply port 15 of the sensor 10 connected to an electrical power supply 20,
  a reference port 16 connected to the electrical ground, an output port 17 of the sensor 10 at which the processor module 14 supplies the signals produced by processing the raw signal.

The processor module 14 advantageously has two modes of operation:
- a first mode of operation, referred to as the "measurement mode", in which the processor module 14 is adapted to supply at an output port 17 a measurement signal representing the times of passage of the teeth D1-D5 of the target 11 at the level of the measuring cell 12 (and possibly, in particular embodiments of the sensor 10, a measurement signal representing the direction of rotation of the target 11),
- a second mode of operation, referred to as the "diagnostic mode", in which the processor module 14 is adapted to supply at said output port 17 a diagnostic signal different from the measurement signal and representing the amplitude of the raw signal.

The processor module 14 includes for example an analogue/digital converter that produces a digital signal from the raw signal. Moreover, the processor module 14 includes for example at least one processor and at least one electronic memory in which a computer program product is stored, in the form of a set of program code instructions to be executed to form the measurement signal and diagnostic signal from the digital signal. In a variant, the processor module 14 includes instead or additionally one or more programmable logic circuits, of FPGA, PLD, etc. type, and/or application-specific integrated circuits (ASIC) adapted to execute some or all of the operations necessary for forming the measurement signal and the diagnostic signal.

In other words, the processor module 14 includes a set of software means (specific computer program product) and/or hardware means (FPGA, PLD, ASIC, etc.) to form the measurement signal and the diagnostic signal from the raw signal.

The processor module 14 therefore supplies either the measurement signal or the diagnostic signal at the same port of the sensor 10, here the output port 17, depending on whether it is configured in the measurement mode or in the diagnostic mode. In the example illustrated by FIG. 1, the output port 17 of the sensor 10 is connected to an electronic computer 30, for example the engine computer of the motor vehicle, and to a diagnostic module 40.

In preferred embodiments of the sensor 10, the processor module 14 is adapted to be configured in the measurement mode or in the diagnostic mode via one or more of the electric power supply port 15, the reference port 16 and the output port 17. Thus no additional port dedicated to the configuration is necessary.

For example, the processor module 14 may be configured to use the diagnostic mode if, after starting up the sensor 10, a predefined message indicating changing to the diagnostic mode is received at the electrical power supply port 15 or at the output port 17. If no message indicating changing to the diagnostic mode is received during a predefined time interval, the processor module 14 utilizes the measurement mode. In this case, the change from the measurement mode to the diagnostic mode therefore necessitates restarting the sensor 10, for example by temporarily switching off the electrical power supply, and sending the message indicating changing to the diagnostic mode to the processor module 14. Changing from the diagnostic mode to the measurement mode necessitates only restarting the sensor 10. However, in accordance with other examples, there is nothing to rule out implementing a communication protocol enabling the sensor 10 to switch at any time from the measurement mode to the diagnostic mode.

As indicated above, the measurement signal represents the times of passage of the teeth D1-D5 of the target 11 in front of the measuring cell 12. In fact, by analysing these passage times, the computer 30 can distinguish between said teeth D1-D5 (in particular the tooth D1) and therefore determine the angular position of the target 11 and deduce from it the angular position of the camshaft or the crankshaft.

Figure 2:
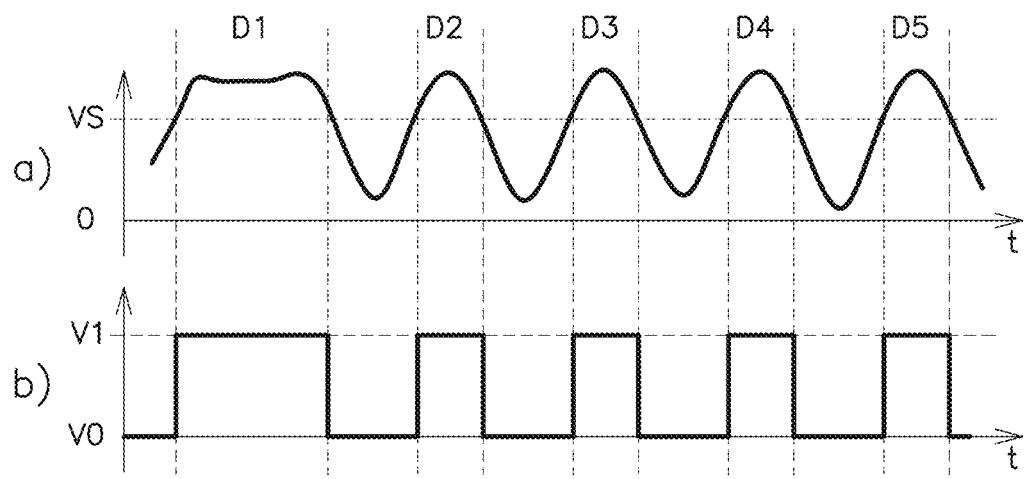
FIG. 2: curves illustrating examples of a raw signal supplied by a measurement cell and a measurement signal determined from said raw signal.

Part a) of FIG. 2 represents an example of a raw signal supplied by the measurement cell 12, representing the variations of the magnetic field induced by the rotation of the target 11 represented in FIG. 1. It is seen that the raw signal includes alternating local maxima and local minima. To be more specific, the measurement signal:
- is substantially sinusoidal when the teeth D2, D3, D4 and D5 pass in front of the measuring cell 12,
- remains for longer at a local maximum when the tooth D1 passes in front of the measuring cell 12.

Part b) of FIG. 2 represents diagrammatically one non-limiting example of a measurement signal that can be supplied by the processor module 14, based on the raw signal illustrated in part a). In this example, the measurement signal is a signal able to assume two states, a high state V1 and a low state V0, depending on whether the raw signal is above or below a predefined threshold value VS, for example. The measurement signal therefore consists of alternating rising edges and falling edges. The passage of a tooth D1-D5 of the target 11 in front of the measuring cell 12 corresponds to a pulse of the measuring signal and said pulses correspond to a temporal representation of the geometry of the periphery of the target 11. It is therefore clear that the computer 30 can distinguish between the various teeth of the target 11 based on the pulses of the measurement signal. In particular, the pulse of longest duration corresponds to the tooth D1 of the target 11.

The diagnostic signal represents the amplitude of the raw signal. In fact, deformations of the teeth D1-D5 of the target 11 will notably be reflected in fluctuations of the values of the local maxima and of the local minima of the raw signal. It is therefore primarily on the basis of the amplitude of the raw signal that the diagnostic module 40 is able to diagnose the target 11 of the sensor 10.

Several forms of diagnostic signal are possible. For example, the diagnostic signal may correspond directly to the digital signal obtained at the output of the analogue/digital converter of the processor module 14. However, the bit rate necessary to transfer a diagnostic signal of this kind to the diagnostic module 40 may prove to be high.

In preferred embodiments, the diagnostic signal corresponds to one or more values of local maxima of the raw signal. In other words, the processor module 14 identifies the local maxima of the digital signal produced from the raw signal and the diagnostic signal consists in these local maxima values. In such a case, the number of values to be transmitted to the diagnostic module 40 is greatly reduced and the necessary bit rate between the processor module 14 and the diagnostic module 40 is therefore limited.

In the remainder of the description, the nonlimiting situation is that in which the diagnostic signal includes only values of local maxima of the raw signal.

In the diagnostic mode, the processor module 14 may for example supply automatically and continuously the successive values of the local maxima of the raw signal at the output port 17 of the sensor. In accordance with another nonlimiting example, the processor module 14 may supply the values of the local maxima of the raw signal at the output port 17 only at the request of the diagnostic module 40.

Figure 3:
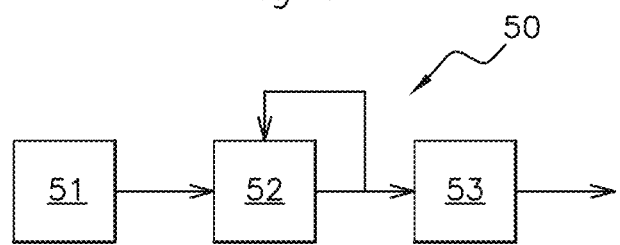
FIG. 3: a diagram illustrating the principal steps of one embodiment of a method of diagnosing a camshaft or crankshaft sensor.

FIG. 3 represents diagrammatically the principal steps of a method 50 of diagnosing a camshaft or crankshaft sensor 10 that is executed by the diagnostic module 40.

As illustrated by FIG. 3, the diagnostic method 50 includes first of all a step 51 of configuring the processor module 14 in the diagnostic mode, for example via the electrical power supply port 15 and/or the output port 17, as described above.

The diagnostic method 50 then includes a recurrent step 52 of recovering the diagnostic signal at the output port 17. The diagnostic signal recovery step 52 may employ any suitable communication protocol, the particular communication protocol chosen merely constituting one variant of the invention.

The diagnostic method 50 then includes a step 53 of diagnosing the sensor 10 during which the processor module 14 determines if the sensor 10 is faulty ("false round", etc.) by comparison of the diagnostic signals recovered at the output port 17 of the sensor 10. In accordance with one nonlimiting example, the sensor 10 is considered faulty if the ratio between the maximum value and the minimum value of the local maxima of the raw signal is above a predefined threshold value.

In preferred embodiments of the sensor 10, the processor module 14 supplies, on each execution of the diagnostic signal recovery step 52, only the value of the last local maximum identified by the processor module 14. Such features are advantageous in that the requirements in terms of memory space are very small. In fact, the processor module 14 has to store only one local maximum value at a time. The processor module 14 is for example configured to write the value of the last local maximum identified in a register, overwriting the value of the preceding local maximum identified.

In such a case, the recovery step 52 is preferably executed with a frequency sufficiently high to recover in one rotation of the target 11 values of the local maxima corresponding to each of the teeth D1-D5 of said target 11.

In particular embodiments, the recovery step 52 is executed with a frequency, constant over time, determined as a function of a predefined maximum value of the rotation speed of the target 11. Alternatively, it is possible to estimate the real rotation speed of said target 11 and to adapt the execution frequency of the recovery step 52 dynamically as a function of the real rotation speed of said target 11.

The diagnostic module 40 includes for example at least one processor and at least one electronic memory in which is stored a computer program product in the form of a set of program code instructions to be executed to implement the steps of the diagnostic method 50. In a variant, the diagnostic module 40 includes instead or additionally one or more programmable logic circuits, of FPGA, PLD, etc. type, and/or application-specific integrated circuits (ASIC) adapted to execute some or all of the steps of the method 50 of diagnosing the sensor 10.

In other words, the diagnostic module 40 includes a set of software means (dedicated computer program product) and/or hardware means (FPGA, PLD, ASIC, etc.) for executing the method 50 of diagnosing the sensor 10.

In the example illustrated by FIG. 1, the diagnostic module 40 is separate from the computer 30. For example, the diagnostic module 40 is connected to the output port 17 of the sensor 10 to effect the control operations and is disconnected after it has effected those operations, before the automobile vehicle enters traffic. In other examples, there is nothing to exclude having a diagnostic module 40 incorporated in the motor vehicle in order to monitor the status of the sensor 10 regularly. In such a case, the diagnostic module 40 is preferably integrated into the computer 30.

More generally, it is to be noted that the embodiments considered above have been described by way of nonlimiting example and that other variants can therefore be envisaged.

In particular, the invention has been described considering, in order to limit the necessary bit rate between the processor module 14 and the diagnostic module 40, that the diagnostic signal contained only the values of the local maxima of the raw signal. In accordance with other examples, there is nothing to rule out considering a diagnostic signal including only the values of the local minima of the raw signal, or including only the values of the local maxima and the local minima of the raw signal, etc. If the diagnostic signal supplied by the processor module 14 corresponds to the values of the last local maximum identified and the last local minimum, then the latter may be stored in different registers, for example (in which case the diagnostic module 40 can recover these two values simultaneously), or in the same register (in which case the diagnostic module 40 alternately recovers the value of the last local maximum identified and the value of the last local minimum identified).

The invention claimed is:

1. A motor vehicle camshaft or crankshaft sensor (10), said sensor comprising:
   a toothed target (11);
   a measuring cell (12) that supplies a raw analog signal corresponding to variations of a magnetic field induced by a rotation of the toothed target (11);
   an output port; and
   a processor module (14), connected to the output port and the measuring cell (12), that processes the raw signal received from the measuring cell (12), the processor module (14) configured to operate in either of two distinct operating modes, a first of the operating modes being a measurement mode and a second of the operating modes being a diagnostic mode,
   the processor module (14) further configured to switch between operating in the measurement mode and the diagnostic mode in response to receiving a predefined message for configuring the processor module (14),
   wherein in the measurement mode, the processor module (14) processes the raw signal and supplies at said output port (17) a measurement signal representing times of passage of teeth of the target (11) at a level of the measuring cell (12), and
   wherein in the diagnostic mode, the processor module (14) supplies at said output port (17) a diagnostic signal, different from the measurement signal and representing amplitudes of the raw signal.

2. The motor vehicle camshaft or crankshaft sensor (10) according to claim 1, wherein the processor module (14) is adapted to switch from the measurement mode to the diagnostic mode in response to reception of the predefined message at one of the output port (17) of the sensor and an electrical power supply port (15) of the sensor.

3. The motor vehicle camshaft or crankshaft sensor (10) according to claim 1, wherein in the diagnostic mode of operation the diagnostic signal corresponds to one or more local maxima values and/or local minima values of the raw signal.

4. The motor vehicle camshaft or crankshaft sensor (10) according to claim 3, wherein in the diagnostic mode of operation the diagnostic signal corresponds to a value of a last local maximum identified and/or a value of a last local minimum identified.

5. The motor vehicle camshaft or crankshaft sensor (10) according to claim 1, comprising only three ports: said output port, a power supply port for supplying operative energy to the sensor (10), and a reference port for connection to ground,
wherein the processor module is adapted to be configured to switch between operating in the measurement mode and the diagnostic mode in response to receiving the predefine message from one or more of the electric power supply port, the reference port, and the output port.

6. The motor vehicle camshaft or crankshaft sensor (10) according to claim 1, further comprising:
a power supply port for supplying operative energy to the sensor (10); and
a reference port for connection to ground,
wherein the processor module is adapted to be configured to switch between operating in the measurement mode and the diagnostic mode in response to receiving the predefine message from one or more of the electric power supply port, the reference port, and the output port.

7. The motor vehicle camshaft or crankshaft sensor (10) according to claim 1,
wherein in the measurement mode, the measurement signal supplied by the processor module (14) to the output port (17) is a pulse signal consisting of pulses that correspond to a temporal representation of the geometry of the periphery of the toothed target (11), and
wherein in the diagnostic mode, the amplitudes of the raw signal are represented by the diagnostic signal as values of local maxima and of local minima of the raw signal, correspondent to deformations of the teeth of the target (11).

8. The motor vehicle camshaft or crankshaft sensor (10) according to claim 1, wherein in the diagnostic mode, the amplitudes of the raw signal represented by the diagnostic signal consist in local maxima values of local maxima of the raw signal, generated by analog-to-digital conversion.

9. A method (50) of diagnosing a motor vehicle camshaft or crankshaft sensor (10), comprising:
a step of providing a sensor for sensing a presence of a tooth of a toothed target that rotates with the camshaft or crankshaft, the sensor having each of
a measuring cell (12) that supplies a raw analog signal corresponding to variations of a magnetic field induced by a rotation of the toothed target,
an output port (17), and
a processor module (14), connected to the output port and the measuring cell (12), that processes the raw signal, the processor module (14) configured to operate in either of two distinct operating modes, a first of the operating modes being a measurement mode and a second of the operating modes being a diagnostic mode,
the processor module (14) further configured to switch between i) operating in the measurement mode in which the processor module (14) supplies at said output port (17) a measurement signal representing times of passage of teeth of the target (11) at a level of the measuring cell (12), and ii) operating in the diagnostic mode in which the processor module (14) supplies at said output port (17) a diagnostic signal, different from the measurement signal and representing amplitudes of the raw signal;
a configuration step (51) of sending a predefined message to the processor module (14) to cause the processor module (14) to operate in the diagnostic mode;
a recurrent recovery step (52) of recovering the diagnostic signal at the output port (17), the diagnostic signal corresponding to a value of a local maximum and/or a local minimum of the raw signal; and
a diagnostic step (53) of diagnosing the sensor (10) by comparing the diagnostic signals recovered at the output port of the sensor.

10. The method (50) according to claim 9, wherein the recurrent recovery step (52) is executed at particular times as a function of a predefined maximum value of the rotation speed of the target so as to recover in one rotation of the target values of the local maxima and/or local minima corresponding to each of the teeth of said target.

11. The method (50) according to claim 9, wherein the recurrent recovery step (52) is executed at particular times as a function of an estimate of a real rotation speed of the target so as to recover in one rotation of the target values of the local maxima and/or the local minima corresponding to each of the teeth of said target.

12. The method (50) according to claim 9,
wherein, in the recurrent recovery step (52), the diagnostic signal corresponds to a value of the local maximum of the raw signal, and
wherein during the diagnostic step (53) the sensor (10) is determined to be faulty if a ratio between a maximum value and a minimum value of the local maxima of the raw signal is greater than a predefined threshold value.

13. The method according to claim 9, wherein, during the configuration step, the predefined message is received via either of the outlet port and an electrical power supply port (15) for supplying operative power to the sensor.

14. A diagnostic module (40) for diagnosing a camshaft or crankshaft sensor (10), comprising:
means for interfacing with an output port of the camshaft or crankshaft sensor (10); and
processing means having a memory connected thereto, said processing means configured to perform functions of
transmitting a message via the output port to a processor module (14) of the camshaft or crankshaft sensor (10) that causes said processor module (14) to switch from operating in a measurement mode in which the processor module (14) supplies at said output port a measurement signal representing times of passage of teeth of a target at a level of a measuring cell (12) to a diagnostic mode in which the processor module supplies at said output port a diagnostic signal, different from the measurement signal and representing an amplitude of a raw analog signal produced by the measuring cell,
recurrently recovering the diagnostic signal from the output port and storing the diagnostic signal in the memory, so as to recurrently store a plurality of diagnostic signals corresponding to a value of a local maximum and/or a local minimum of a raw signal generated by the sensor, and
comparing the diagnostic signals.

15. The motor vehicle camshaft or crankshaft sensor (10) according to claim 2, wherein the diagnostic signal corresponds to one or more local maxima values and/or local minima values of the raw signal.

16. The module for diagnosing a camshaft or crankshaft sensor according to claim 14,
wherein the processing means recurrently stores a plurality of diagnostic signals corresponding to a value of the local maximum of the raw signal generated by the sensor (10), and
wherein the processing means determines that the sensor (10) is faulty if a ratio between a maximum value and a minimum value of the local maxima of the raw signal is greater than a predefined threshold value.

17. An electronic sensing apparatus for sensing a position of a toothed target (11) that rotates with an operative rotation of a machine, the apparatus comprising:
a measuring cell (12) that detects variations in a magnetic field inducted thereupon by rotation of the toothed target (11);
an output port; and
a processor module (14), connected to the output port and the measuring cell (12), that processes a raw analog signal received from the measuring cell (12), the processor module (14) configured to operate in either of two distinct operating modes, a first of the operating modes being a measurement mode and a second of the operating modes being a diagnostic mode,
the processor module (14) further configured to switch between operating in the measurement mode and the diagnostic mode in response to receiving a predefined message for configuring the processor module (14),
wherein in the measurement mode, the processor module (14) processes the raw signal and supplies at said output port (17) a measurement signal representing times of passage of teeth of the target (11) at a level of the measuring cell (12), and
wherein in the diagnostic mode, the processor module (14) supplies at said output port (17) a diagnostic signal, different from the measurement signal and representing amplitudes of the raw signal.

18. The electronic sensing apparatus according to claim 17, comprising only three ports: said output port, a power supply port for supplying operative energy to the apparatus, and a reference port for connection to ground,
wherein the processor module is adapted to be configured to switch between operating in the measurement mode and the diagnostic mode in response to receiving the predefine message from one or more of the electric power supply port, the reference port, and the output port.

19. The electronic sensing apparatus according to claim 17, further comprising:
a power supply port for supplying operative energy to the apparatus; and
a reference port for connection to ground,
wherein the processor module is adapted to be configured to switch between operating in the measurement mode and the diagnostic mode in response to receiving the predefine message from one or more of the electric power supply port, the reference port, and the output port.

20. The electronic sensing apparatus according to claim 17, wherein the processor module (14) is adapted to switch from the measurement mode to the diagnostic mode in response to reception of the predefined message at one of the output port (17) of the sensor and an electrical power supply port (15) for supplying operative energy to the apparatus.

* * * * *